US008898735B2

(12) United States Patent
Huh et al.

(10) Patent No.: US 8,898,735 B2
(45) Date of Patent: Nov. 25, 2014

(54) NETWORK APPARATUS BASED ON CONTENT NAME, METHOD OF GENERATING AND AUTHENTICATING CONTENT NAME

(71) Applicant: Samsung Electronics Co., Ltd., Suwon-si (KR)

(72) Inventors: Mi Suk Huh, Suwon-si (KR); Byoung Joon Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/623,573

(22) Filed: Sep. 20, 2012

(65) Prior Publication Data

US 2013/0074155 A1    Mar. 21, 2013

(30) Foreign Application Priority Data

Sep. 21, 2011 (KR) .................. 10-2011-0095367

(51) Int. Cl.
*G06F 7/04* (2006.01)
*H04L 29/08* (2006.01)
*H04L 29/06* (2006.01)

(52) U.S. Cl.
CPC .............. *H04L 67/06* (2013.01); *H04L 63/065* (2013.01); *H04L 63/104* (2013.01); *H04L 63/123* (2013.01); *H04L 67/327* (2013.01); *H04L 67/1097* (2013.01)
USPC .......................................................... 726/3

(58) Field of Classification Search
CPC ... H04L 63/065; H04L 63/104; H04L 63/123; H04L 67/06; H04L 67/1097; H04L 67/327
USPC ................... 713/150, 168; 726/2, 3; 709/229
See application file for complete search history.

(56) References Cited

U.S. PATENT DOCUMENTS

| 8,326,981    | B2 * | 12/2012 | Tock et al. ................. 709/224 |
| 2002/0120844 | A1 * | 8/2002  | Faccin et al. ............... 713/168 |
| 2005/0010769 | A1 * | 1/2005  | You et al. .................. 713/168 |
| 2007/0157072 | A1 * | 7/2007  | LaBiche .................... 715/501.1 |
| 2009/0287835 | A1 * | 11/2009 | Jacobson ................... 709/229 |
| 2010/0317399 | A1 * | 12/2010 | Rodriguez ................. 455/556.1 |
| 2011/0090908 | A1 * | 4/2011  | Jacobson et al. ........... 370/392 |

FOREIGN PATENT DOCUMENTS

| KR | 10-2004-0015714 A | 2/2004 |
| KR | 10-2005-0007830 A | 1/2005 |
| KR | 10-2006-0056909 A | 5/2006 |
| KR | 10-2007-0018569 A | 2/2007 |
| WO | WO 2010/069617 A1 | 6/2010 |

OTHER PUBLICATIONS

Christian Dannewitz et al, "Secure Naming for a Network of Information", Mar. 15, 2010, IEEE 2010.*

(Continued)

*Primary Examiner* — Samson Lemma
(74) *Attorney, Agent, or Firm* — NSIP Law (57) ABSTRACT

A method of generating and authenticating a content name in content-centric networking (CCN) and a network apparatus are provided. A content name generation method includes generating authentication information using a secret key shared by network apparatuses that belong to a domain in content-centric networking (CCN); and generating a content name that includes the authentication information.

12 Claims, 6 Drawing Sheets

(56) References Cited

OTHER PUBLICATIONS

Kopnen T el al ; "A data-oriented (and beyond) newtwork architecture" Oct. 1, 2007, ACM, New York, US.*
European Search Report dated May 6, 2013 issued in counterpart European Patent Application No. 12185250.3 (13 pages in English).
Dannewitz, Christian, et al. "Secure naming for a network of Information," INFOCOM IEEE Conference on Computer Communications Workshop, 2010. IEEE, 2010, (pp. 1-6).
Wong, Walter, et al. "Secure naming in information-centric networks." Proceedings of the Re-Architecting the Internet Workshop. ACM, 2010. (pp. 1-6).
Strufe, Thorsten, et al. "Efficient content distribution in semi-decentralized peer-to-peer networks." Proceedings of the 8th International Netties Conference, Ilmenau, Germany. 2002. (pp. 1-6).
Koponen, Teemu, et al. "A data-oriented (and beyond) network architecture." ACM SIGCOMM Computer Communication Review. vol. 37. No. 4. ACM, 2007. (pp. 1-12).
Smetters, Diana, et al. "Securing network content." Relatório Técnico TR-2009-1, Xerox Palo Alto Research Center-PARC (2009). (pp. 1-10).
Zhang, Xinwen, et al. "Towards name-based trust and security for content-centric network." Network Protocols (ICNP), 2011 19th IEEE International Conference on. IEEE, 2011. (pp. 1-6).
Ahlgren, Bengt, et al. "A Survey of Information-Centric Networking (Draft)." Draft for Dagstuhl seminar on Information-Centric Networking (2011). (pp. 1-26).

* cited by examiner

NETWORK APPARATUS BASED ON CONTENT NAME, METHOD OF GENERATING AND AUTHENTICATING CONTENT NAME

CROSS-REFERENCE TO RELATED APPLICATION(S)

This application claims the benefit under 35 U.S.C. §119 (a) of Korean Patent Application No. 10-2011-0095367, filed on Sep. 21, 2011, in the Korean Intellectual Property Office, the entire disclosure of which is incorporated herein by reference for all purposes.

BACKGROUND

1. Field

The following description relates to a technology for protecting contents by preventing the generation of a content name by a user without permission in a content-centric network (CCN) or a named-data network (NDN).

2. Description of Related Art

In content-centric network/named-data network (CCN/NDN), data communication is performed based on a name of content. In other words, while a communication target is traced using an Internet protocol (IP) address in an IP-based data communication, a communication target, such as a content, is traced using the content name in a content-centric network (CCN).

In the event that domain information is included in the content name, a network apparatus may acquire and display the content that includes the domain information from a plurality of neighboring network apparatuses. If such a conventional content name-based network apparatus requests a content that includes desired domain information, the network apparatus may receive and display a content name generated by a random network apparatus that does not belong to the domain.

For example, when the network apparatus belongs to a subdomain 1 among a plurality of subdomains constituting an upper-level domain, the network apparatus may receive contents such as spam and advertisements generated with the domain information of the subdomain 1 by a network apparatus that belongs to a domain other than the subdomain 1.

If a network apparatus that belongs to another domain intentionally pushes contents such as spam and advertisements to another network apparatus, the conventional content name-based network apparatus may display unnecessary information. Also, the network apparatus may accept the pushed request of the network apparatus that belongs to another domain and make a request for the content based on the pushed request. As a result, network resources may be wasted and network traffic may increase.

Accordingly, there is a demand for a new technology for efficiently using network resources and reducing traffic consumption by distinguishing and processing contents that may be generated maliciously.

SUMMARY

In one general aspect, there is provided a content name generation method that includes generating authentication information using a secret key shared by network apparatuses that belong to a domain in content-centric networking (CCN), and generating a content name that includes the authentication information.

The generating of the authentication information may include generating the authentication information using at least one of the secret key that varies according to a version of the content name, content name information, and domain information.

The generating of the content name may include generating the content name using at least one of the authentication information, content name information, version information, signature information, segment information, and content data.

The content name generation method may further include receiving a request message requesting the content name, and transmitting list information related to the content name in response to the request message.

The list information may include at least one of the authentication information, domain information, content name information, and version information.

At least one of the network apparatuses may be a mobile device, a computer or a server.

In another general aspect, there is provided a network apparatus that includes an authentication information generation unit configured to generate authentication information using a secret key shared by network apparatuses belonging to a domain in content-centric networking (CCN), and a content name generation unit configured to generate a content name that includes the authentication information.

The authentication information generation unit may generate the authentication information using at least one of a secret key varied according to a version of the content name, content name information, and domain information.

The content name generation unit may generate the content name using at least one of the authentication information, content name information, version information, signature information, segment information, and content data.

The network apparatus may further include a message receiving unit configured to receive a request message requesting the content name, and an information transmission unit configured to transmit list information related to the content name that includes the authentication information, in response to the request message requesting the content name.

The network apparatus may further include an update unit configured to update the domain, and the authentication information generation unit may generate the authentication information using the secret key varied as the domain is updated.

The network apparatus is a mobile device, a computer or a server.

In another general aspect, there is provided a content name authentication method that includes transmitting a request message requesting a content name in content-centric networking (CCN), receiving list information related to the content name from network apparatuses constituting the CCN, and authenticating the list information related to the content name using a secret key of a domain to which the content name is belongs.

The list information related to the content name may include authentication information generated using at least one of a secret key shared by network apparatuses belonging to a domain to which the content name belongs, content name information, and domain information.

The authenticating of the list information may include authenticating whether the list information corresponds to the content name of the request message, using the secret key and authentication information included in the list information.

The authenticating of the list information may include requesting content data corresponding to the content name in response to authentication of the list information using the secret key and the authentication information being successful.

The authenticating of the list information may include discarding the list information related to the content name in response to authentication of the list information using the secret key and the authentication information being unsuccessful.

The content name authentication method may further include storing the secret key varied according to a version of the content name, and the authenticating of the list information may include authenticating the list information related to the content name using the secret key corresponding to the version of the content name.

In a further general aspect, there is provided a network apparatus that includes a message transmission unit configured to transmit a request message requesting a content name in content-centric networking (CCN), an information receiving unit configured to receive list information related to the content name from network apparatuses constituting the CCN, and an authentication unit configured to authenticate the list information related to the content name using a secret key of a domain to which the content name belongs.

The list information related to the content name may include authentication information generated using at least one of the secret key shared by network apparatuses belonging to a domain to which the content name belongs, content name information, and domain information.

The authentication unit may authenticate whether the list information corresponds to the content name of the request message using the secret key and the authentication information included in the list information.

The authentication unit may request content data corresponding to the content name in response to authentication of the list information using the secret key and the authentication information being successful, and may discard the list information related to the content name in response to authentication of the list information using the secret key and the authentication information being unsuccessful.

The network apparatus may be a mobile phone, a computer or a server.

In yet another general aspect, there is provided a mobile device for receiving list information from another mobile device, the mobile device including a processor configured to authenticate the list information using a secret key shared by apparatuses that belong to a domain to which the mobile device belongs, and the mobile device being configured to transmit a request for a content data in response to a determination that the authentication is successful.

The mobile device may be configured to discard the list information in response to a determination that the authentication is unsuccessful.

The secret key may include a domain key of a domain to which the mobile device belongs or a content name information.

The secret key may update each time the domain updates. The mobile device may be configured to receive the list information in response to a broadcasted request message.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be apparent to one of ordinary skill in the art. Any sequences of processing steps and/or operations described herein are merely examples, and the sequences of processing steps and/or operations are not limited to the specific examples set forth herein, and may be changed as will be apparent to one of ordinary skill in the art, with the exception of processing steps and/or operations necessary to occur in a certain order to carry out the methods. Also, description of well-known functions and constructions may be omitted for increased clarity and conciseness.

In an Internet Protocol (IP)-based network, contents are usually requested, searched and routed based on an IP address to the original owner of the content. However, in a CNN, contents may be requested, searched and routed based on a content name.

Figure 1:
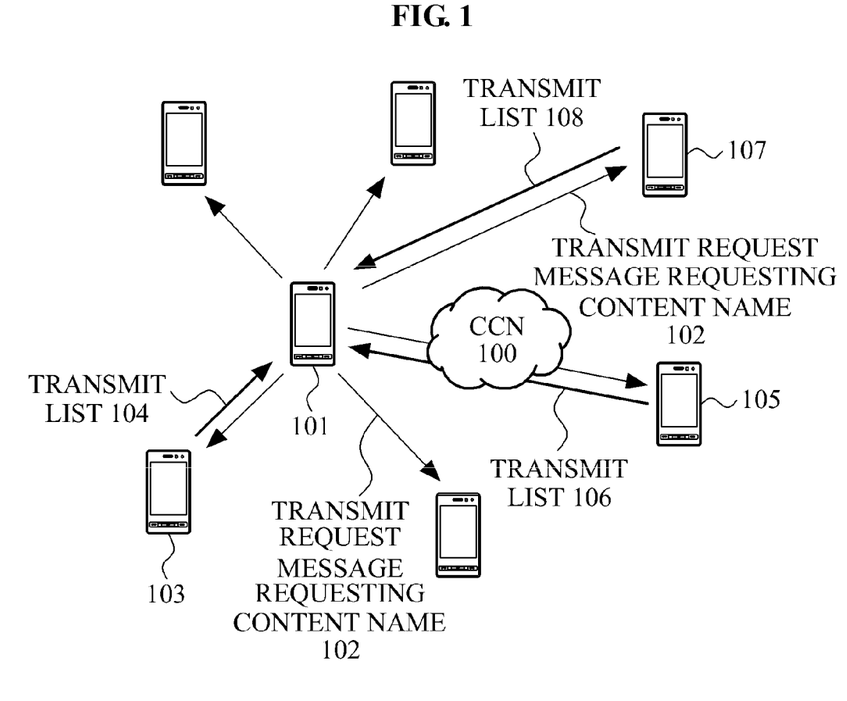
FIG. 1 is a diagram illustrating an example of a content-centric network (CCN).

FIG. 1 illustrates an example of a content-centric network (CCN).

Illustrated in FIG. 1 are network apparatuses that constitute a CCN. In 102, a first network apparatus 101 broadcasts to other network apparatuses in the network a request message that requests a content name in order to identify contents shared in a domain to which the first network apparatus 101 belongs. The network apparatuses may include mobile devices, smart phones, computers, laptops, terminals, servers and the like.

Upon receiving the request message that requests the content name, the network apparatuses may transmit list information related to the content name to the first network apparatus 101 in response to the request message. For example, a second network apparatus 103, a third network apparatus 105, and a fourth network apparatus 107 may transmit the list information to the first network apparatus 101.

In this example, the third network apparatus 105 belongs to the same domain as the first network apparatus 101 or belongs to a subdomain of the domain of the first network apparatus 101, and the second network apparatus 103 and the fourth network apparatus 107 belong to a domain other than the domain of the first network apparatus 101. The first network apparatus 101 may receive the list information related to the content name transmitted by the second network apparatus 103 and the fourth network apparatus 107. For instance, the first network apparatus 101 may receive from the second network apparatus 103 and the fourth network apparatus 107 an advertisement, spam, or the like, which may be m irrelevant to the broadcasted request message.

In such an event, the first network apparatus 101 may use the authentication information inserted in the content name to authenticate whether the list information received from the second network apparatus 103 and the fourth network apparatus 107 corresponds to the broadcasted request message. In the event that the authentication is successful, the first network apparatus 101 may request content data from the second network apparatus 105 based on the list information. In the event that the authentication is unsuccessful, the first network apparatus 101 may discard the list information received from the second network apparatus 103 and the fourth network apparatus 107.

Thus, the first network apparatus 101 may authenticate the list information using the authentication information that relates to the content name.

Figure 2:
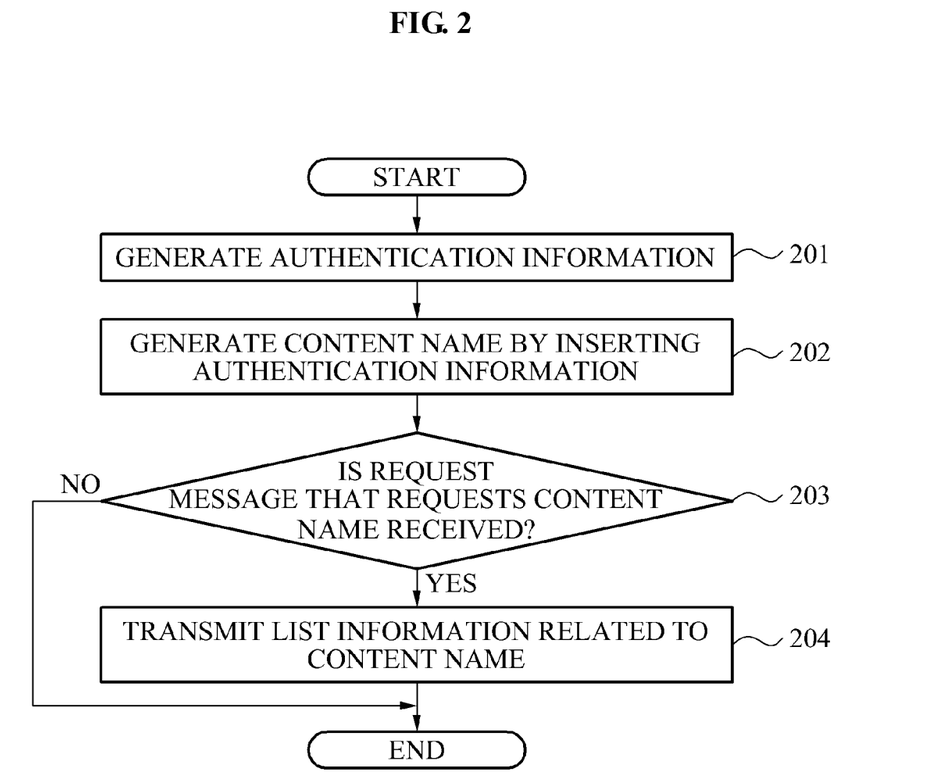
FIG. 2 is a flowchart illustrating an example of a method for generating a content name using authentication information.

Hereinafter, a process of generating the content name by inserting the authentication information is described with reference to FIGS. 2 to 4. A process of authenticating the list information using the authentication information is described with reference to FIGS. 5 and 6. FIG. 2 illustrates an example of a method for generating a content name using authentication information.

Figure 3:
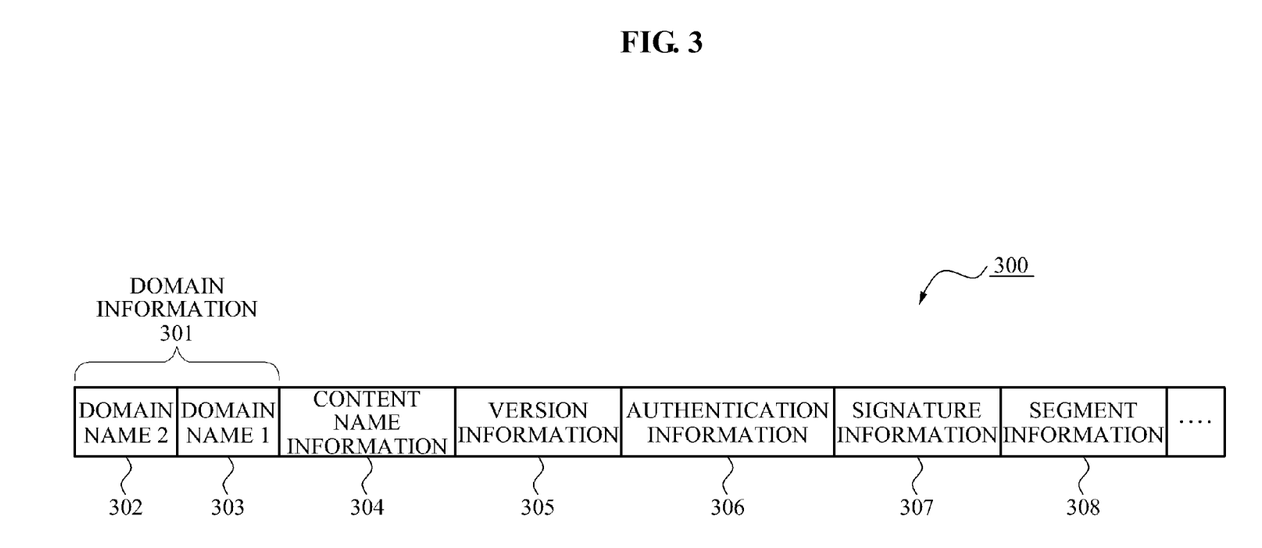
FIG. 3 is a diagram illustrating an example of content name.

FIG. 3 illustrates an example of a content name used in CCN.

In 201, a network apparatus generates the authentication information using at least one of: a secret key shared by network apparatuses belonging to a domain, content name information, and domain information. For example, a domain key may be used as the secret key. Accordingly, the secret key may be updated every time the domain is updated. Therefore, the network apparatus may generate the authentication information in response to the domain being updated. The network apparatus may generate the authentication information, using at least one of the updated secret key, the content name information, and the domain information.

For example, if the domain is updated after a first content name related to a first content is generated using a first secret key, the network apparatus may generate a second content name related to a second content using a second secret key shared by network apparatuses that belong to the updated domain. Accordingly, the network apparatus may protect the second content from neighboring network apparatuses that have the first secret key but not the second secret key generated after the domain was updated.

As another example, the network apparatus may generate the authentication information by applying the content name information and the domain information, which are to be authenticated. The network apparatus may generate the authentication information by applying the content name information and the domain information to a hash function using the secret key. For instance, the network apparatus may generate the authentication information using a hash-based message authentication code (HMAC) denoting 'secret key, information to be authenticated=domain information+content name information.' Accordingly, even if network apparatuses that do not belong to the domain generate a content name by randomly inserting the same domain name, issues caused by the content name generated by the network apparatuses may be reduced because the authentication information is generated using the secret key shared by the network apparatuses that belong to the same domain.

In this example, the network apparatus generates the content name by inserting the authentication information in 202.

Referring to FIG. 3, a content name 300 includes: domain information 310 on a domain to which content belongs, content name information 304, version information 305, authentication information 306, signature information 307, segment information 308, and content data. The version information 305 refers to a content name generation version that may be used to inform a domain updated at the time of generating the content name.

For example, the network apparatus may generate the content name 300 by inserting the authentication information after the content name information 304 or the version information 305. Specifically, when the content name 300 is initially generated, the version information 305 may be absent. In such an event, the network apparatus may generate the content name 300 by inserting the authentication information such that the authentication information is located continuously with the content name information 304. In the event that the version information 305 exists, the network apparatus may generate the content name 300 by inserting the authentication information such that the authentication information is located continuously with the version information.

In the event that the content is shared by: a first domain 303, which includes the content, and a second domain 302, which is an upper-level domain of the first domain 303, the domain information may include: first content name information denoting the first domain 303 and second content name information denoting the second domain 302.

If the network apparatus receives a request message that requests the content name as in 203 of FIG. 2, the network apparatus transmits list information related to the content name in 204. The list information may include the domain information, the content name information, and the authentication information. When version information exists, the list information may further include the version information.

Figure 4:
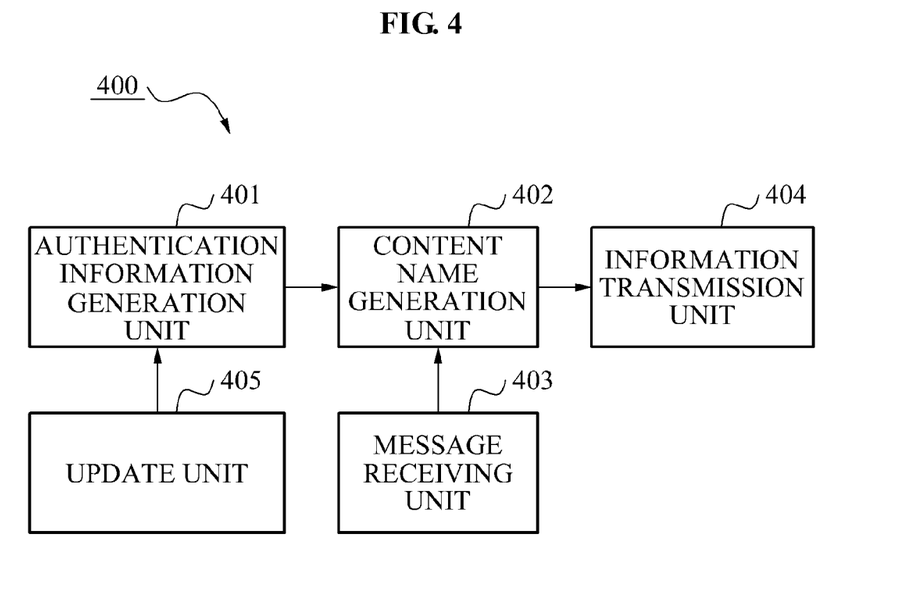
FIG. 4 is a diagram illustrating an example of a network apparatus that generates a content name in which authentication information is included.

FIG. 4 illustrates a structure of a network apparatus. In this example, the network apparatus generates a content name. The authentication information is inserted in the content name.

Referring to FIG. 4, a network apparatus 400 includes an authentication information generation unit 401, a content name generation unit 402, a message receiving unit 403, an information transmission unit 404, and an update unit 405. The authentication information generation unit 401, the content name generation unit 402, the message receiving unit 403, the information transmission unit 404, and the update unit 405 may include one or more processor, or may share one or more processor, and may include a non-transitory memory.

In an example, the authentication information generation unit 401 may generate authentication information using at least one of: a secret key, content name information, and domain information. The secret key may include a domain key shared by network apparatuses belonging to a domain in CCN.

In another example, the authentication information generation unit 401 may generate the authentication information using at least one of the secret key varied according to a version of the content name, the content name information, and the domain information. The secret key may be changed every time the domain is updated.

For example, the authentication information generation unit 401 may generate the authentication information by applying the content name information and the domain information, which are to be authenticated, to an HMAC using the secret key.

The content name generation unit 402 may generate the content name using the authentication information. For example, the content name may include at least one of: the domain information, the content name information, version information, the authentication information, signature information, segment information, and content data. If the content is segmented into a plurality of contents, the content name may include the segment information to distinguish the segmented contents. If the content is not segmented, the content name may not include the segment information.

In the event that the content name is initially generated and the version information is therefore absent, the content name generation unit 402 may generate the content name by inserting the authentication information next to the content name information such that the authentication information is located continuously with the content name information.

In the event that the version information exists, the content name generation unit 402 may generate the content name by inserting the authentication information next the version information such that the authentication information is located continuously to the version information.

The message receiving unit 403 may receive a request message requesting the content name. In response to the request message, the information transmission unit 404 may transmit list information related to the content name in which the authentication information is inserted, to the network apparatus that transmitted the request message. The list information may include the domain information, the content name information, and the authentication information. If the version information on a version of the content exists, the list information may further include the version information.

The update unit 405 may periodically update the domain to confirm whether the network apparatuses that belong to the domain are changed. The secret key may be changed every time that the domain is updated. Accordingly, the authentication information generation unit 401 may share the changed secret key with the plurality of network apparatuses that belong to the updated domain. When the content name is generated after the domain is updated, the authentication information generation unit 401 may generate the authentication information using the secret key of the updated domain.

The authentication information generation unit 401, content name generation unit 402, message receiving unit 403, information transmission unit 404, and update unit 405 may include one or more processor, or share one or more processor, and may include a non-transitory memory or include an information transmitter or receiver.

Figure 5:
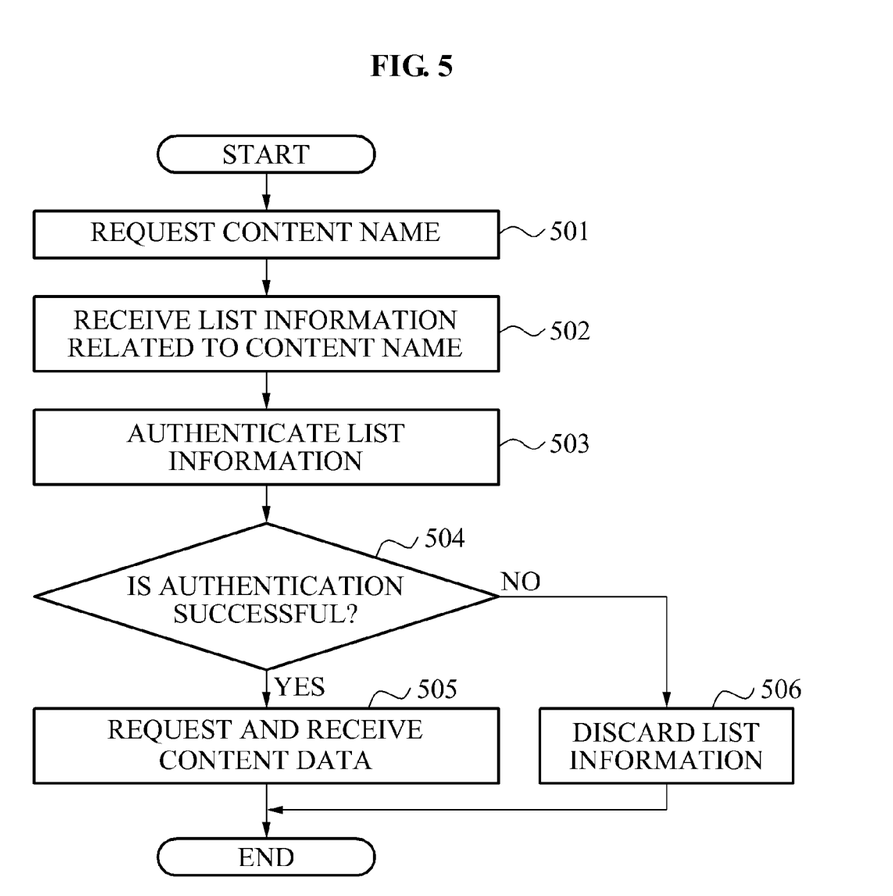
FIG. 5 is a flowchart illustrating an example of a method that authenticates list information related to a content name using authentication information.

FIG. 5 illustrates a method that authenticates list information related to a content name using authentication information.

In 501, a network apparatus may request the content name.

For example, the network apparatus may broadcast to a plurality of network apparatuses in a CCN a request message that requests a content name in order to identify contents shared in a domain to which the network apparatus belongs.

In 502, the network apparatus may the receive list information related to the content name from at least one network apparatus constituting the CCN. In this example, the list information related to the content name may be a response to the request message requesting the content name.

For example, the list information may include domain information, content name information, and authentication information. If version information on a version of the content exists, the list information may further include the version information. In the event that the list information is received from another network apparatus that belongs to a domain other than the domain to which the network apparatus belongs or to a subdomain of the domain to which the network apparatus belongs, the list information may not include the authentication information.

In 503, the network apparatus may authenticate the list information related to the content name using an existing secret key. The existing secret key may include a domain key of the domain to which the network apparatus belongs. Accordingly, when the domain is updated, the secret key may be also updated and stored. Thus, secret keys may vary according to specific versions of the content name. Therefore, the network apparatus may authenticate the list information using the secret key corresponding to the version of the content name.

For example, the network apparatus may authenticate whether the list information corresponds to the requested content name, using the secret key and the authentication information inserted in the list information. In this example, the network apparatus may authenticate whether the received list information is received from neighboring network apparatuses that belong to the same domain of the network apparatus.

When the authentication is successful in 504, the network apparatus may request content data that corresponds to the content name from a neighboring network apparatus that was successfully authenticated in 505.

For example, the network apparatus may display the list information in response to the determination that the authentication of the list information is successful. Therefore, the network apparatus may request the content data corresponding to the content name which is selected by a user from the displayed list information. Next, the network apparatus may receive the requested content data and provide the content data to the user.

In addition, in the event that the authentication is unsuccessful in 504, the network apparatus may discard the list information in 506. Thus, the network apparatus may filter off undesired information such as spam or advertisements, by authenticating the list information using the authentication information related to the content name. Spam or advertisements of other domains that fail the authentication are filtered off and not displayed to the user. As a result, the network apparatus that authenticates the list information using the secret key and the authentication information may remove or reduce traffic utilized by the spam or advertisements of other domains.

Figure 6:
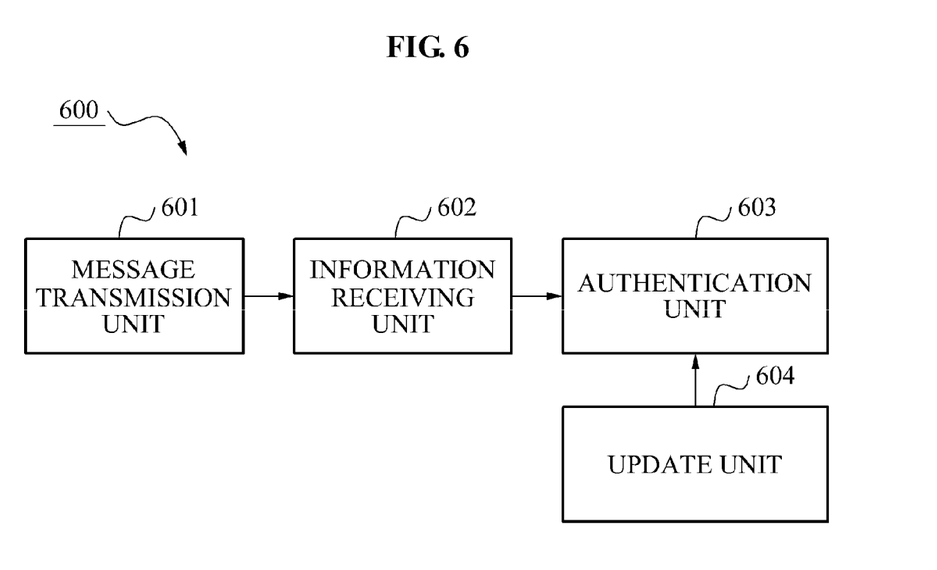
FIG. 6 is a diagram illustrating an example of a network apparatus that authenticates list information related to a content name.

FIG. 6 illustrates a structure of a network apparatus that authenticates list information related to a content name.

Referring to FIG. 6, a network apparatus 600 includes a message transmission unit 601, an information receiving unit 602, an authentication unit 603, and an update unit 604. The message transmission unit 601, information receiving unit 602, authentication unit 603, and update unit 604 may include one or more processor, or share one or more processor. Further, these units may include a non-transitory memory, a message transmitter and/or receiver.

The message transmission unit 601 may broadcast a request message requesting a content name to the CCN. The request message may be used to identify contents of a domain to which the network apparatus 600 belongs.

In this example, the authentication information may be inserted into the list information. The authentication information may be generated using at least one of: a secret key shared by network apparatuses belonging to a domain of the content name, content name information, and domain information. For example, the list information may include the authentication information generated using a secret key of the domain updated at the time of generating the content name. In this example, a domain key may be used as the secret key.

For example, the list information may include the domain information, the content name information, and the authentication information. The authentication information may be located continuously with the content name. In this example, if version information on a version of the content exists, the list information may further include the version information. In this case, the authentication information may be located continuously with the version information.

The information receiving unit 602 may receive the list information related to the content name from neighboring network apparatuses constituting the CCN. For example, the information receiving unit 602 may receive the list information in response to the broadcasted request message that requests the content name. The information receiving unit 602 may receive the list information, not only from neighboring network apparatuses that belong to the same domain as the network apparatus 600 or belong to a subdomain to the domain of the network apparatus 600, but also from at least one neighboring network apparatus that belongs to a domain irrelevant to the network apparatus 600. The list information received from network apparatuses that belong to other domains may include spam or advertisements.

In this case, the authentication unit 603 may authenticate the list information related to the content name using the secret key of the domain to which the content name belongs. Specifically, the authentication unit 603 may, using a pre-stored secret key and the authentication information inserted in the list information, authenticate whether the list information corresponds to the content name of the request message.

In the event that the authentication is successful, the authentication unit 603 may display the list information corresponding to the content name. When a user selects a particular content name based on the displayed list information, the authentication unit 603 may request content data corresponding to the selected content name.

In the event that the authentication is unsuccessful, the authentication unit 603 may discard the list information, thereby filtering off the list information received from the neighboring network apparatuses that belong to a domain other than the domain of the network apparatus 600 or the subdomain to the domain of the network apparatus 600. Accordingly, the filtered spam or advertisements are not displayed to the user, and undesired traffic consumption may be removed or reduced.

In the foregoing, a network apparatus generating a content name and a network apparatus authenticating a content name have been separately described with reference to FIGS. 4 to 6. However, the above described apparatuses are provided only as examples of ways of generating and authenticating content names. In other examples, the generation and authentication of the content name may be performed in one network apparatus.

In addition, although it has been explained, thus far, that authentication information is generated using a secret key shared by network apparatuses that belong to a domain, this description is provided only as an example. Other ways of authentication are applied in other examples. For instance, in another example, the authentication information may be generated by encrypting the secret key using an encryption key. The encryption key may be shared by the network apparatuses that belong to the domain.

As explained above, the network apparatus and the content name generation method according to various aspects may generate the content name using a domain key and share contents among network apparatuses that belong to a specific domain.

Also, since the content name that belongs to the domain is authenticated using the domain key, a content maliciously generated in network apparatuses that do not belong to the domain may be distinguished. Accordingly, network resources may be utilized efficiently.

The above-described examples may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts.

Examples of non-transitory computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the examples disclosed herein can be easily construed by programmers skilled in the art to which the examples pertain based on and using the flow diagrams and block diagrams of the figures and their corresponding descriptions as provided herein.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

Also, the described unit to perform an operation or a method may be hardware, software, or some combination of hardware and software. For example, the unit may be a software package running on a computer or the computer on which that software is running For example, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner.

The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors. As used herein, a processing device configured to implement a function A includes a processor programmed to run specific software. In addition, a processing device configured to implement a function A, a function B, and a function C may include configurations, such as, for example, a processor configured to implement both functions A, B, and C, a first processor configured to implement function A, and a second processor configured to implement functions B and C, a first processor to implement function A, a second processor configured to implement function B, and a third processor configured to implement function C, a first processor configured to implement function A, and a second processor configured to implement functions B and C, a first processor configured to implement functions A, B, C, and a second processor configured to implement functions A, B, and C, and so on.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion.

Several examples have been described above. Nevertheless, it should be understood that various modifications may be made in these examples. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A content name generation method comprising:
   generating, with a computer processor, authentication information using a domain key shared by network apparatuses that belong to a domain in content-centric networking (CCN); and
   generating a content name that includes the authentication information, wherein
   the domain key is updated when the domain is updated.

2. The content name generation method of claim 1, wherein the generating of the authentication information comprises:
   generating the authentication information using at least one of a domain key that varies according to a version of the content name, content name information, and domain information.

3. The content name generation method of claim 1, wherein the generating of the content name comprises:
   generating the content name using at least one of the authentication information, content name information, version information, signature information, segment information, and content data.

4. The content name generation method of claim 1, further comprising:
   receiving a request message requesting the content name; and
   transmitting list information related to the content name in response to the request message.

5. The content name generation method of claim 4, wherein the list information comprises at least one of the authentication information, domain information, content name information, and version information.

6. The content name generation method of claim 1, wherein at least one of the network apparatuses is a mobile device, a computer or a server.

7. A network apparatus comprising:
   a computer processor configured to:
      generate authentication information using a domain key shared by network apparatuses belonging to a domain in content-centric networking (CCN); and
      generate a content name that includes the authentication information, wherein
      the domain key is updated when the domain is updated.

8. The network apparatus of claim 7, wherein the computer processor generates the authentication information using at least one of a domain key varied according to a version of the content name, content name information, and domain information.

9. The network apparatus of claim 7, wherein the computer processor generates the content name using at least one of the authentication information, content name information, version information, signature information, segment information, and content data.

10. The network apparatus of claim 7, further comprising:
    a receiver configured to receive a request message requesting the content name; and
    a transmitter configured to transmit, in response to the request message requesting the content name, list information related to the content name that includes the authentication information.

11. The network apparatus of claim 7, wherein the computer processor is further configured to:
    update the domain, and
    generate the authentication information using the domain key, which is varied as the domain is updated.

12. The network apparatus of claim 7, wherein the network apparatus is a mobile device, a computer or a server.

* * * * *